US004001656B2

United States Statutory Invention Registration [19]

[11] Reg. Number: H1656

Dekoninck

[45] Published: Jun. 3, 1997

[54] POLYOLEFINS AND METHODS TO PRODUCE POLYOLEFINS HAVING INCREASED MELT PROPERTIES AT LOW SHEAR RATES

[75] Inventor: Jean-Marc C. M. G. Dekoninck, Brussels, Belgium

[73] Assignee: Exxon Chemical Company Law Technology, Baytown, Tex.

[21] Appl. No.: 523,172

[22] Filed: Sep. 5, 1995

Related U.S. Application Data

[63] Continuation of Ser. No. 213,888, Mar. 16, 1994.

[51] Int. Cl.[6] ..... C08J 5/05; C08K 5/05; C08L 5/05

[52] U.S. Cl. ..... 524/388

[58] Field of Search ..... 524/108

[56] References Cited

U.S. PATENT DOCUMENTS

| | | | |
|---|---|---|---|
| 4,016,118 | 4/1977 | Hamada et al. | 524/108 |
| 5,015,684 | 5/1991 | Kobayashi et al. | 524/108 |
| 5,049,605 | 9/1991 | Rekers | 524/108 |
| 5,084,534 | 1/1992 | Welborn, Jr. et al. | 526/160 |
| 5,296,580 | 3/1994 | Matsunaga et al. | 528/502 |

FOREIGN PATENT DOCUMENTS

| | | | |
|---|---|---|---|
| 0 092940 A3 | 11/1983 | European Pat. Off. . | |
| 61-13252A | 6/1986 | Japan . | |
| WO 95/13317 | 5/1995 | WIPO | 524/108 |

OTHER PUBLICATIONS

Kenneth Mason Publications Ltd., Dudley House – England; *Research Disclosure,* Aug. 1994, No. 364) "Method Of Gelling Non–polar Oils With Dibenzyldene Sorbitol (DBS) Through The Use Of Co–Solvents" (article No. 36406).

Extract on Nucleating Agents from Taschenbuch der Kunststoffe–Additive ("Handbook of Plastics Additives"), 3d ed., R. Gächter and H. Müller, editors, Munich and Vienna: Carl Hanser Verlag, pp. 896–905.

*Primary Examiner*—Charles T. Jordan
*Assistant Examiner*—Meena Chelliah

[57] ABSTRACT

This invention relates to a method for increasing melt properties such as melt strength, melt viscosity, hot tack and processability of a polyolefin by combining a networking agent with a polyolefin preferably by combining substituted or unsubstituted sorbitol or isomers or derivatives thereof with a polyolefin.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYOLEFINS AND METHODS TO PRODUCE POLYOLEFINS HAVING INCREASED MELT PROPERTIES AT LOW SHEAR RATES

This is a continuation, of application Ser. No. 08/213,888 filed Mar. 16, 1994.

FIELD OF THE INVENTION

This invention relates to a method to increase melt properties at low shear rates without significantly affecting the melt properties at high shear rates. This invention relates to polyolefin compositions modified by an additive capable of producing high viscosity at low shear rates but does not substantially alter the viscosity at high shear rates.

BACKGROUND OF THE INVENTION

It is a constant struggle in the art to find methods for improving the melt strength of a polymer melt composition so that it can be subjected to more stresses during processing. Low melt strength polymers can not be easily shaped or formed and thus are difficult and expensive to process. In contrast, high melt strength polymers process easier and do not require special handling.

Sorbitol and other such nucleating agents are known for their use in polyolefins, especially polypropylene, to alter the crystallization rate of the polyolefin. Specifically, sorbitol is used in polypropylene to increase the crystallization rate thus decreasing time spent in a mold waiting for the resin to harden. Sorbitol and like nucleating agents are also used in ascorbic acid fermentation, in cosmetic creams and lotions, toothpastes, tobaccos, gelatins, bodying agents (for paper, textiles, and liquid pharmaceuticals), softeners (candy), sugar crystallization inhibitors, surfactants (urethane resins and rigid foams), plasticisers, stabilizers for vinyl resins, food additives, sweeteners, humectants, emulsifiers, thickeners, anti-caking agents and dietary supplements. These agents, however, have not been used before to modify the rheology of a polyolefin.

SUMMARY OF THE INVENTION

This invention relates to a method to increase the melt viscosity of a polyolefin at low shear rates comprising blending a composition that forms a network at low deformation rates between about 0.01 and 10 $sec^{-1}$ but does not form or maintain networks at high deformation rates of greater than 100 $sec^{-1}$ with a polyolefin.

DETAILED DESCRIPTION OF THE INVENTION

This invention relates in part to the discovery that compositions capable of forming a light network, such as a fibril network, at low shear rates, while not forming such networks at high shear rates, will act to increase the melt viscosity and the melt strength at low shear rates of a given polymer, while not affecting the melt viscosity at high deformation rates. Thus, a networking agent that forms a light microfibril network is employed in accordance with a preferred embodiment of the present invention. Sorbitol and its substituted and isomeric forms and derivatives thereof are the preferred agents. Substituted sorbitol such as, di-benzylidene sorbitol and other commercial substituted sorbitols are particularly preferred agents. The agent is blended typically at 1 weight percent or less with a polyolefin. This very small amount of the networking agent has the unique effect of increasing melt strength and viscosity of the polyolefin blend at low shear rates.

Preferred polyolefins for use in this invention comprise, but are not limited to, any polymer of a $C_2$ to $C_{100}$ olefin, preferably $C_2$ to C30 olefins. Preferred monomers include ethylene, propylene, butene, pentene, hexene, heptene, octene, nonene, decene, dodecene, hexadecene, dodecyldodecene, 3-methyl-pentene-1, 3,5,5-trimethylhexene-1, vinyl acetate and the like. Preferred polyolefins include polyethylene, polypropylene, polybutene, ethylene propylene rubber, ethylene propylene diene monomer rubber, ethylene-butene copolymer, ethylene vinyl acetate copolymer and the like. In addition preferred polyolefins may be of any weight average molecular weight and any molecular weight distribution (Mw/Mn). The preferred polyolefins have a molecular weight distribution of 3 or less. One of ordinary skill in the art will choose the resin to be blended with the agents based upon the desired properties of the final product. For example films are usually blown from polymers having Mw's of 50,000.

In another embodiment, the polyolefin has a composition distribution breadth index (CDBI) of 50% or greater, preferably about 60% or greater, even more preferably 70% or greater. Composition distribution breadth index (CDBI) is measured by a method defined and described in Patent Cooperation Treaty publication WO 9303093 published Feb. 18, 1993. Likewise, preferred polyolefins may also comprise a diene co- or ter-polymer. Preferred comonomers include dienes having 3 to 60 carbon atoms, even more preferably 3 to 30 carbon atoms.

Representative examples of dienes that may be used as the second or third monomer include:

a. Straight chain acyclic dienes such as: 1,4-hexadiene; 1,5-heptadiene; 1,6-octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4-allyl cyclohexene and 1-isopropenyl-4-(4-butenyl) cyclohexane.

d. Multi-single ring alicyclic dienes such as: 4,4'-dicyclopentenyl and 4,4'-dicyclohexenyl.

e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethylidene norbornene; 5-methylene-6-methyl-2-norbornene; 5-methylene-6, 6-dimethyl-2-norbornene; 5-propenyl-2-norbornene; 5-(3-cyclo-pentylidene)-2-norbornene and 5-cyclohexylidene-2-norbornene; etc.

In particularly preferred embodiments, homopolymers and copolymers of ethylene having up to 30 wt % of a $C_3$ to C30 alpha-olefin comonomer are blended with up to 1.0 wt % of the networking agent, preferably substituted sorbitol or a derivative thereof. An Example of a substituted sorbitol can be purchased as Millad 3905™ from Milliken Chemical.

The networking agent can be any agent that forms a light network under low shear. This network is light enough that it does not remain when subjected to high shear rates and thus does not alter the viscosity by more than 10% at higher shear rates. The networking agent is preferably present at or about 1 weight percent or less based upon the weight of the polyolefin, preferably about 1.0 wt % to about 0.005 wt %, even more preferably about 0.8 to about 0.01 wt %, even more preferably 0.6 wt % to 0.05 wt %, even more preferably 0.6 to 0.2 wt %.

The blends of this invention can be produced by methods known in the art for blending additives into polyolefins. For example polyethylene can be dry-blended with networking agents such as sorbitol in a standard mixing vessel, and thereafter can be transferred into a standard extruder.

The blended product has the properties of low viscosity at high shear rates and high viscosity and high melt strength at low shear rates. Likewise, the networking agents reduce haze and enhance strength properties such as tear (in both machine and transverse directions).

The modified polyolefins of this invention have one or more of: increased melt strength at low shear rates, increased viscosity at low shear rates, increased tear strength, increased dart impact and reduced haze. In particular, the melt viscosity at a shear or deformation rate of 1 $sec^{-1}$ or less is usually increased by at least about 50%, even more preferably at least about 100%, even more preferably at least about 200%, while the melt viscosity at a shear rates of 100 $sec^{-1}$ or more is increased by no more than 10%.

EXAMPLES

Melt index (MI) is measured by ASTM D 1238, condition E. Density is measured by ASTM 792, haze is measured by ASTM D-1003, procedure A, tear is measured by ASTM D-1922, dart impact is measured by ASTM D-1709/75 (PL/002) and viscosity is measured by a Rheometrics RMS-800 rotational Rheometer operated in oscillatory (sinusoidal deformation) mode with the molten sample between parallel plates of 25 mm diameter and with a sample thickness of 1 to 2 mm. The frequency range is 0.1 to 100 radians per second at a maximum strain amplitude of 10%.

Example 1

Exact 3011A™, an ethylene polymer commercially available from Exxon Chemical Co. produced using a cyclopentadienyl transition metal compound in combination with methylalumoxane catalysts, having an MI of 1.0 dg/min, a density of 0.9 g/cc, and a CDBI of ≧50%, and Millad 3905™ ( dibenzylidene sorbitol), were blended in varying proportions in a plastograph brabender. The polyolefin was first melted at 190° C., 60 rpm, under nitrogen for 3 minutes. Different levels of Millad 3905™ were added and blended for 3 minutes more. The blends were then compression molded into films of about 1 mm thickness, at 218° C. (425° F.) for a total of 5 minutes and cooled for three minutes at about 27° C. (80° F.). Rheology data were accumulated on a Rheometrics RMS 800 at 140° C. under a 10% strain. The following Table I reports complex viscosity values, $\eta^*$, (in Pa-s) at 100 and 1 rad/sec at 140° C.

TABLE I

| SAMPLE polyethylene/sorbitol | VISCOSITY @ 100 ($sec^{-1}$) | VISCOSITY @ 1 ($sec^{-1}$) |
|---|---|---|
| EXACT 3011A ™/0.0 wt. | $4.58 \times 10^3$ | $1.73 \times 10^4$ |
| EXACT 3011A ™/0.2 wt. | $4.11 \times 10^3$ | $2.07 \times 10^4$ |
| EXACT 3011A ™/0.4 wt. | $4.57 \times 10^3$ | $4.17 \times 10^4$ |

Melt extensional deformation data were obtained using the combination of a Goettfert Rheograph 2001 capillary rheometer as the extrudate source and a Goettfert Rheotens extensional rheometer to stretch the extruding filament. The capillary rheometer had a barrel diameter of 15 mm, and used a 10 mm long×2 mm diam.×180° entry angle die. Data were taken at 160° C. with plunger speed set to yield a constant 20 $sec^{-1}$ shear rate in the die, with initial wheel velocity in the Rheotens set (as per standard operating method) to yield zero balance arm force and accelerated at 60 $mm/sec^2$. Table II reports the melt strength of one polyolefin of the blend.

TABLE II

| Wt % sorbitol | Melt Strength (cN) |
|---|---|
| 0 | 5.5 |
| 0.4 | 17 |

An ethylene/hexene copolymer having a melt index of 1.0 dg/min and a density of 0.920 $g/cm^3$ and 0.4 wt % sorbitol are blended in an extruder at about 220° C. and subsequently blown into a film on an Egan 1.5 inch (3.81 cm) film blowing machine. The maximum throughput, as determined by the onset of bubble instability, was 1.5 or more times greater than the maximum throughput of the unblended ethylene copolymer. Data and conditions are reported in Tables III and IV below.

TABLE III

| Temperature Profile (in °F.) | | Draw ratio | 100 |
|---|---|---|---|
| Barrel 1 | 410 (210° C.) | Gauge (mils) | 1 (.25 mm) |
| Barrel 2 | 410 | Lay Flat (in) | 14 (35.6 cm) |
| Barrel 3 | 410 | Frost Line (in) | 21 (53.3 cm) |
| Adapter | 410 | Blow-up ratio | 3 |
| Die 1 | 410 | | |
| Die 2 | 410 | | |
| Melt | 422 (217° C.) | | |

TABLE IV

| | Base Resin | Blend |
|---|---|---|
| Line Speed (fpm) | 26 (7.9 mpm) | 55 (16.8 mpm) |
| Screw Speed (rpm) | 36 | 90 |
| Output (kg/h) | 10.5 | 19.6 |

(mpm - meters per minute)

Transmission electron micrographs of sections of the films obtained above stained with Ruthenium tetraoxide (Phillips EM/300 TEM) show distinct microfibers of sorbitol dispersed in the polyolefin.

Physical properties of the two films are reported below in Table V.

TABLE V

| Property | Base Resin | Blend |
|---|---|---|
| TD tear (g/mil) (g/micron) | 440 (17.3) | 500 (19.7) |
| MD tear (g/mil) (g/micron) | 349 (13.7) | 390 (15.4) |
| Dart impact (g/mil) (g/micron) | >1000 (>39.4) | >1000 (>39.4) |
| Haze (%) | 29 | 5 |

(1 mil = 25.4 μm)

Haze is measured by ASTM D-1003 161 Procedure A. Tear (MD and TD) is measured by ASTM D-1922. Dart impact is measured by ASTM D-1709/75 Method A (PL/002).

As is apparent from the foregoing description, the materials prepared and the procedures followed relate to specific preferred embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

I claim:

1. A method to increase low shear rate melt viscosity of a polyolefin having a molecular weight distribution of 3 or less, said method comprising blending said polyolefin with 0.005 weight percent to 1.0 weight percent of dibenzylidene sorbitol, based upon the weight of the polyolefin to form a blend, wherein the melt viscosity of the blend as compared to the polyolefin is increased by at least about 50 percent at deformation rates of 1 $sec^{-1}$ or less and by 10 percent or less at deformation rates of greater than about 100 $sec^{-1}$ or more.

2. The method of claim 1 wherein the polyolefin is a polymer of one or more $C_2$ to $C_{30}$ alpha-olefins.

3. The method of claim 2 wherein the polyolefin is a homopolymer or copolymer of ethylene.

4. The method of claim 2 wherein the polyolefin is a copolymer of ethylene and hexene.

5. The method of claim 3 wherein the dibenzylidene sorbitol is present at about 0.01 weight percent to about 0.8 weight percent based upon the weight of the polyolefin.

6. The method of claim 3 wherein the dibenzylidene sorbitol is present at about 0.2 weight percent to about 0.6 weight percent based upon the weight of the polyolefin.

7. The method of claim 3 wherein the polyolefin has a composition distribution breadth index of 50% or more.

8. The method of claim 2 wherein the polyolefin is a homopolymer or copolymer of propylene.

9. The method of claim 3 wherein the polyolefin has a composition distribution breadth index of 60% or more.

10. The method of claim 3 wherein the polyolefin has a composition distribution breadth index of 70% or more.

* * * * *